United States Patent
Srigiriraju

(10) Patent No.: US 9,500,759 B2
(45) Date of Patent: Nov. 22, 2016

(54) IDENTIFICATION OF MULTIPLES CONTAMINATION IN SEISMIC IMAGES

(71) Applicant: Schlumberger Technology Corporation, Sugar Land, TX (US)

(72) Inventor: Ramachandra Srigiriraju, Channai (IN)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 135 days.

(21) Appl. No.: 14/050,750

(22) Filed: Oct. 10, 2013

(65) Prior Publication Data

US 2014/0247969 A1 Sep. 4, 2014

Related U.S. Application Data

(60) Provisional application No. 61/772,258, filed on Mar. 4, 2013.

(51) Int. Cl.
*G01V 1/36* (2006.01)

(52) U.S. Cl.
CPC ............... *G01V 1/364* (2013.01); *G01V 1/362* (2013.01); *G01V 2210/56* (2013.01)

(58) Field of Classification Search
None
See application file for complete search history.

(56) References Cited

U.S. PATENT DOCUMENTS

| 4,992,995 | A * | 2/1991 | Favret | G01V 1/36 367/43 |
| 5,051,960 | A | 9/1991 | Levin | |
| 6,735,527 | B1 * | 5/2004 | Levin | G01V 1/36 702/14 |
| 2003/0176975 | A1 * | 9/2003 | Matteucci | G01V 1/364 702/17 |
| 2009/0316527 | A1 * | 12/2009 | Stewart | G01V 1/364 367/24 |
| 2010/0246324 | A1 | 9/2010 | Dragoset et al. | |
| 2011/0125406 | A1 | 5/2011 | Nemeth et al. | |
| 2012/0041682 | A1 | 2/2012 | Ramirez-Perez et al. | |
| 2012/0253758 | A1 | 10/2012 | Lazaratos et al. | |

OTHER PUBLICATIONS

R Essenreiter, M Karrenbach, and S Treitel, "Multiple Reflection Attenuation in Seismic Data Using Backpropagation," IEEE Transactions on Signal Processing, vol. 46, No. 7, Jul. 1998.*

(Continued)

*Primary Examiner* — Matthew Bella
*Assistant Examiner* — Soo Shin
(74) *Attorney, Agent, or Firm* — Rodney Warfford; Garrett Atkinson

(57) ABSTRACT

Methods, systems, and computer-readable media for identifying multiples contamination in a stack are provided. The method includes identifying spatially an area of potential multiples contamination in the stack. The method also includes constructing, using a processor, a model of multiples contamination using well data, and evaluating a degree of contamination in the area of potential contamination using the model of multiples contamination. The method further includes attenuating multiples contamination in the areas of multiples contamination, and validating the stack after attenuating.

21 Claims, 7 Drawing Sheets

(56) References Cited

OTHER PUBLICATIONS

A Mocnik, "Processing and Analysis of Seismic Reflection Data forHydrocarbon Exploration in the Plio-Quaternary Marine Sediments," University of Trieste, Doctoral thesis, 2010.*
S Hartzell, S Harmsen, RA Williams, et al. "Modeling and Validation of a 3D Velocity Structure for the Santa Clara Valley, California, for Seismic-Wave Simulations," Bulletin of the Seismological Society of America, vol. 96, No. 5, pp. 1851-1881, Oct. 2006.*
A Perrone, G Zeni, S Piscitelli, et al. "Join analysis of SAR interferometry and electrical resistivity tomography surveys for investigating ground deformation: the case-study of Satriano di Lucania (Potenza, Italy)," Engineering Geology, vol. 88, Issues 3-4, Dec. 15, 2006, pp. 260-273.*
International Search Report and Written Opinion issued in PCT/US2014/019962 on Jun. 10, 2014, 13 pages.
Petroleum Geo-Services, "Advanced Multiple Elimination: Application to a complex seismic land data set", Tech Link, vol. 8, No. 5, May 2008, 4 pages.

* cited by examiner

IDENTIFICATION OF MULTIPLES CONTAMINATION IN SEISMIC IMAGES

CROSS-REFERENCE TO RELATED APPLICATIONS

This application claims the benefit under 35 U.S.C. §119(e) to U.S. Provisional Patent Application Ser. No. 61/772,258, entitled "IDENTIFICATION OF MULTIPLES CONTAMINATION IN SEISMIC IMAGES," which was filed on 4 Mar. 2013, and is hereby incorporated by reference in its entirety.

BACKGROUND

Seismic images of a given area are generated by introducing a seismic wave into the area from a source. A portion of the wave proceeds downward, into the ground, until a portion thereof is reflected back upward by a "reflector" due to impedance changes, according to Snell's law. The reflected wave generally proceeds upwards and is detected by geophones or other receivers disposed at mapped locations, offset from the introduction point of the wave. The signals from the various receivers over time are then "stacked" or added together, to form a more complete seismic image. The stacking process may include a variety of analysis techniques, including moveout analysis, to compensate for the different locations of the receivers.

Moreover, prior to stacking, the pre-stack signals may be filtered to remove noise therefrom, which may result in a crisper image. Multiple reflections, or "multiples," are one type of noise that is to be filtered. Multiples occur as a returning, reflected signal encounters a boundary between two rock layers of different impedance. As with the downward moving signal, the reflected signal is partially reflected, but this time, back downwards. Accordingly, the signal may reverberate between boundaries with relatively high impedance contrast ratios several times, before returning to the surface. As such, the time at which the signal is received may be inaccurate and may produce interference with primary signals of deeper layers.

In many cases, multiples may be non-hyperbolic events, in contrast to the hyperbolic primary signals. Thus, the multiples may be sufficiently distinct from the primary signals that they too may be filtered out during pre-stack processing, using any one or more of a variety of processes. However, in areas where a high dip in the seismic profile is seen below a strong reflector, high-order multiples may be present, such as "peg-leg" multiples. Peg-leg multiples are multiples that traverse a non-symmetric path from the introduction point to the receiver, i.e., may reflect upward off of a first reflector, then downward off of a second reflector, then upward again off of a third reflector at a different level from the first, etc. Peg-leg multiples may manifest as near-hyperbolic events. Accordingly, at least portions of the peg-leg multiple may closely mimic the primary signals from lower levels, such that the peg-leg multiples are difficult to filter out in pre-stack processing and thus may be included in the stacked image.

SUMMARY

Methods, systems, and computer readable media for identifying multiples contamination in a stack are provided. The method includes identifying a package of interest in the stack, generally by using multiple modeling based at least partially on data collected at well sites. The identified packages may be located in the overburden, above the layer of interest, and may be areas that are expected to generate multiples contamination of primary signals for lower events. The method may also include flattening a first layer corresponding to one of the packages of interest in the stack, e.g., in section view. The method further includes determining that flattening the first layer causes a second layer to appear flattened, which may be further indicative of the first layer generating multiples that contaminate the primary signal of the lower layer. The method may also include identifying and quantifying the effects of such interference, and determining spatially, i.e., in an areal map view, where multiples generated by the first layer interfere with areas of a primary signal of the second layer. This may allow the contaminated areas to be marked or otherwise isolated, and the effects of the multiples attenuated from the stack. The results of the method can be verified, e.g., by comparison to well data, to stacks generated using other multiples mitigation techniques, and/or by comparison of the near, far, and middle stacks.

It will be appreciated that the foregoing summary is intended to introduce a portion of the subject matter described below, and is not to be considered limiting on the claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. The patent or application file contains at least one drawing executed in color. Copies of this patent or patent application publication with color drawing(s) will be provided by the Office upon request and payment of the necessary fee. In the figures.

DETAILED DESCRIPTION

Figure 1:
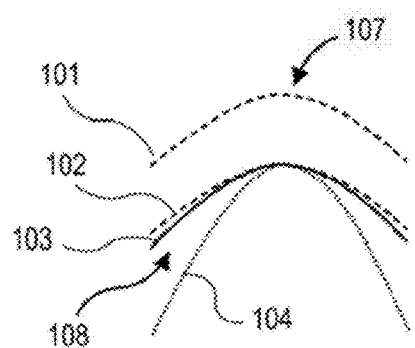
FIG. 1 illustrates a conceptual, schematic view of a peg-leg multiple interfering with a primary signal, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 illustrates a simplified, conceptual view of a seismic image, according to an embodiment. As shown, the seismic image may include at least two primary signals 101, 102, which may be produced by reflection events, e.g., impedance contrasts at rock layer boundaries. In some cases, episodes of orogeny of a particular area may create increased (i.e., narrower and/or taller) dip at consecutively lower levels, for example, in a layer-cake geology. Accordingly, a peg-leg multiple 103, generated at a higher event, e.g., at the primary signal 101, may have generally the same shape as the primary signal 101, and may be imposed on the primary signal 102 from the lower event. First and third order multiples, which may be illustrated as the multiple 104, may have a greater moveout, or otherwise differ sufficiently in one or more other seismic attributes, such that the multiple 104 may identified and removed in signal processing, pre-stack.

The peg-leg multiple 103 may, on the other hand, have a similar (e.g., marginally greater) moveout than the primary signal 102. At the outer regions of the illustrated image, the peg-leg multiple 103 may not be consistent with the primary signal 102, due to the different shape of the dips. Accordingly, at areas such as 108, portions of the peg-leg multiple 103 may be identified in the pre-stack signal processing and may be filtered out. However, proximal to the crestal portions of the dip (shown in the middle of the illustrated image), indicated generally at 107, the peg-leg multiple 103 may have a relatively small, if any, moveout difference with respect to the primary signal 102, and may thus interfere, either constructively or destructively, with the primary signal 102, altering the amplitude, polarity, or other wavelet characteristics. This may affect the accuracy of the seismic attributes associated with the event reflecting the primary signal 102, but may be difficult to identify, pre-stack. This and other knowledge of the (e.g., layer cake) geology of an area may be employed to assist in the development of models of where multiples contamination may be expected in a seismic image.

Figure 3:
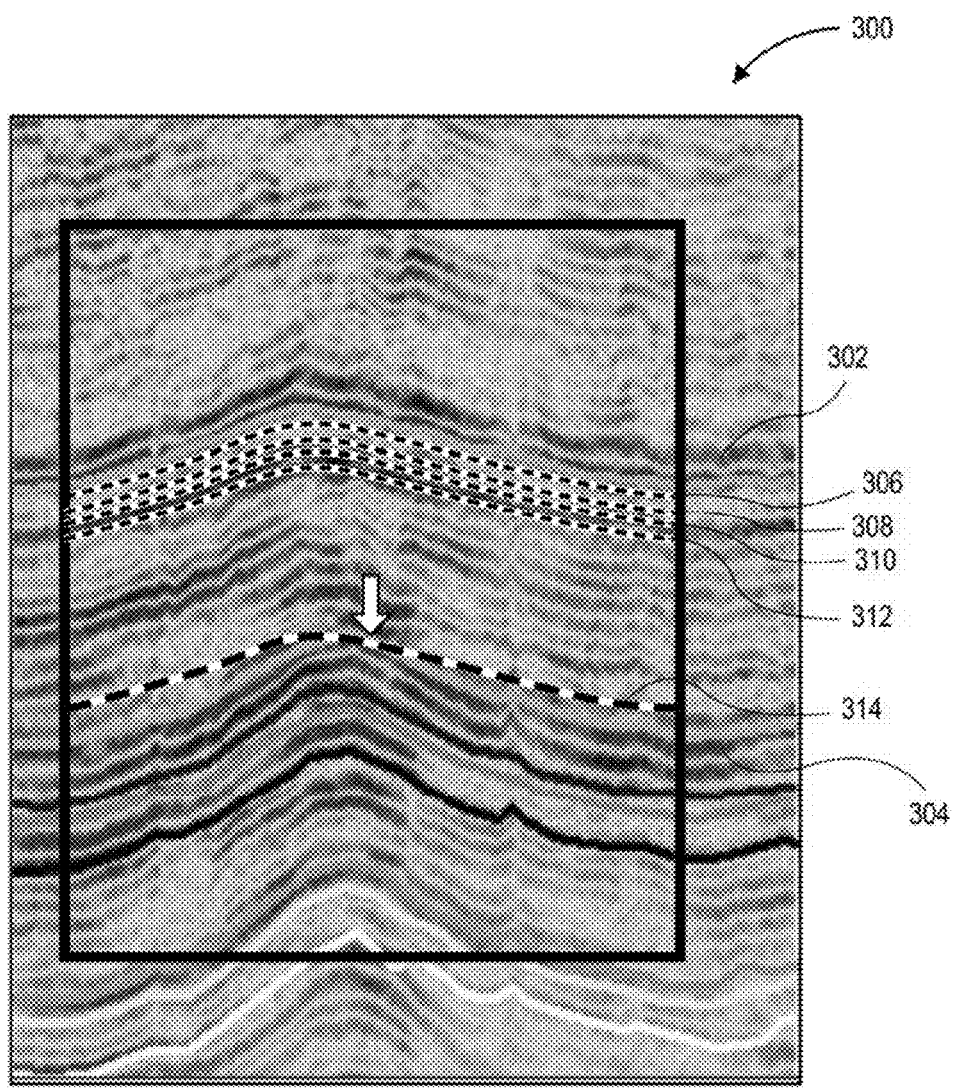
FIG. 3 illustrates a seismic image, according to an embodiment.
Figure 2:
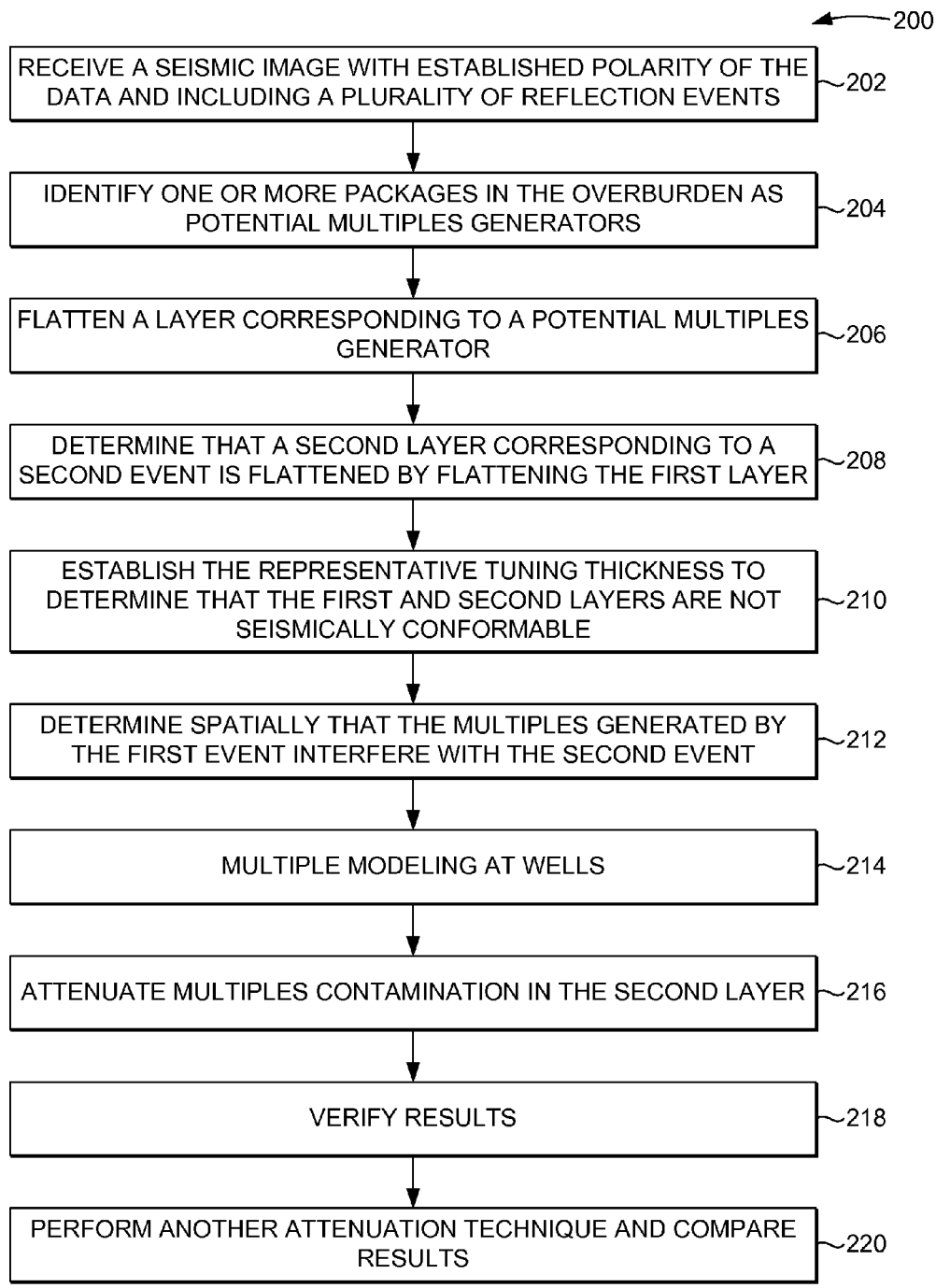
FIG. 2 illustrates a method for isolating peg-leg multiples in a seismic image, according to an embodiment.

FIG. 2 illustrates a method 200 for isolating multiples contamination in a seismic image, according to an embodiment. The method 200 may begin by receiving a seismic image, as at 202, which may evidence a plurality of events for a given polarity of the data explaining the seismic event. FIG. 3 illustrates an example of a partial view of a full-stack seismic image 300, specifically of a layer-cake geology, shown in section. The seismic image 300 includes primary signals 302, 304, which may be contaminated by multiples. The second primary signal 304 is located at a greater depth than (i.e., is subjacent to, but may not be immediately subjacent to) the first primary signal 302. Further, the primary signals 302, 304 may be considered in terms of "packages" in the overburden (rock that is above a reservoir), with each package generally including a top and a bottom in the rock. It will be appreciated that, in addition to the dip increasing as proceeding downward in depth, the dip may be shifted laterally as between primary signals 302 and 304, for example, with the dip for primary signal 302 being leftward (which may be representative of a cardinal direc-tion, e.g., northwest) of the dip for primary signal 304. Such lateral shifting may be due to younger tectonic activity, post-deposition.

As shown in FIG. 2, the method 200 may then proceed to identifying packages in overburden, particularly packages that may be expected to generate multiples interfering with primary signals from lower levels, as at 204. The packages may be identified in a variety of ways. A "brute force" method may be employed, whereby all, or a subset of, packages are considered and identified as potential multiples generators. In other cases, the packages may be identified using vertical seismic profiles, physical data, or other data measured at a nearby (e.g., nearest) well or pilot hole. For example, the packages may be identified using well logs, synthetics, Corridor stacks, calibrated check shorts, mud logs, or a combination thereof. Such data may, in some cases, be considered free or substantially free from multiples contamination, and may thus provide an accurate indication of the lithography of the subterranean area at the well site. Moreover, the packages may be identified consistent with the litho-intervals, as established at the well(s). Using these profiles and/or data, certain packages may be identified through forward, multiples modeling as areas of high impedance contrast layer interfaces or otherwise expected to result in the downward reflection that is characteristic of multiples, including peg-leg multiples.

Accordingly, by reference to such multiples modeling, for example, the event represented by the primary signal 302 may be identified at 204 as a location of a package that may generate multiples. The multiples generated by the event represented by primary signal 302 may manifest in the seismic image 300 as events that are deeper than the event represented by the primary signal 302. A set, or illustrative subset, of such multiples may be illustrated as dashed lines 306, 308, 310, and 312. The multiples 306-312 may be separated from the primary signals 302, 304, but may interfere with primary signals disposed there between. In some cases, the separated multiples 306-312 may be detected during pre-stack processing and may thus be attenuated; therefore, these multiples 306-312 may not be included in the seismic image 300, but in some cases may interfere with one or more primary signals. In the illustrated case, the multiples 306-312 are indicated below the primary signal 302, illustrating the event associated therewith as a strong multiples generator.

A peg-leg multiple 314 may, however, be incident in the seismic image 300 proximal to the primary signal 304 representing the lower event, which may be representative of a layer of interest (e.g., proximal to or at a reservoir). As shown, away from the crestal areas of the dip structure, i.e., proceeding horizontally away from the middle of the seismic image 300, the peg-leg multiple 314 may show moveout separation from the primary signal 304. This may be due to the different dip characteristics of the shallower layer, represented by the primary signal 302, which may be expected as described above with respect to FIG. 1. Accordingly, some or even a majority of the multiple 314 may show separation from the primary signal 304 and may thus be filtered out during pre-stack processing. Moreover, as noted above, the dip of the event represented by the primary signal 302 may be shifted laterally with respect to the dip of the deeper event represented by the primary signal 304, for example, due to geological characteristics of the layer in which the event represented by the primary signal 304 exists.

However, in the crestal portion of the structure, the multiple 314 may show no moveout difference compared to the primary signal 304. For example, the multiple 314 may intersect the primary signal 304 or be disposed near thereto. In instances where the peg-leg multiple 314 is of sufficiently low period, this may cause interference with the primary signal 304 that is not easily detected and/or removed during pre-stack processing or other types of processing.

The method 200 may then proceed to flattening a first one of the layers, e.g., the first primary signal 302, as at 206. The flattening at 206 may proceed in order to determine which of the packages identified at 204 are likely generators of multiples interfering with the primary signal 304 for the lower event. Accordingly, in some cases, flattening at 206 may proceed subsequent to identifying the packages, at 204, such that at least some of the packages identified at 204 are those that are flattened. Further, the flattening may occur in sequence, with each identified package being flattened and the effects analyzed. For example, the method 200 may begin by flattening the deeper layers and proceeding to the shallower layers. However, in some cases, the method 200 may begin by focusing on a particular level of interest. Further, time surfaces both in the overburden and in the target layers may be signal consistent, agreeing with well markers.

Figure 4:
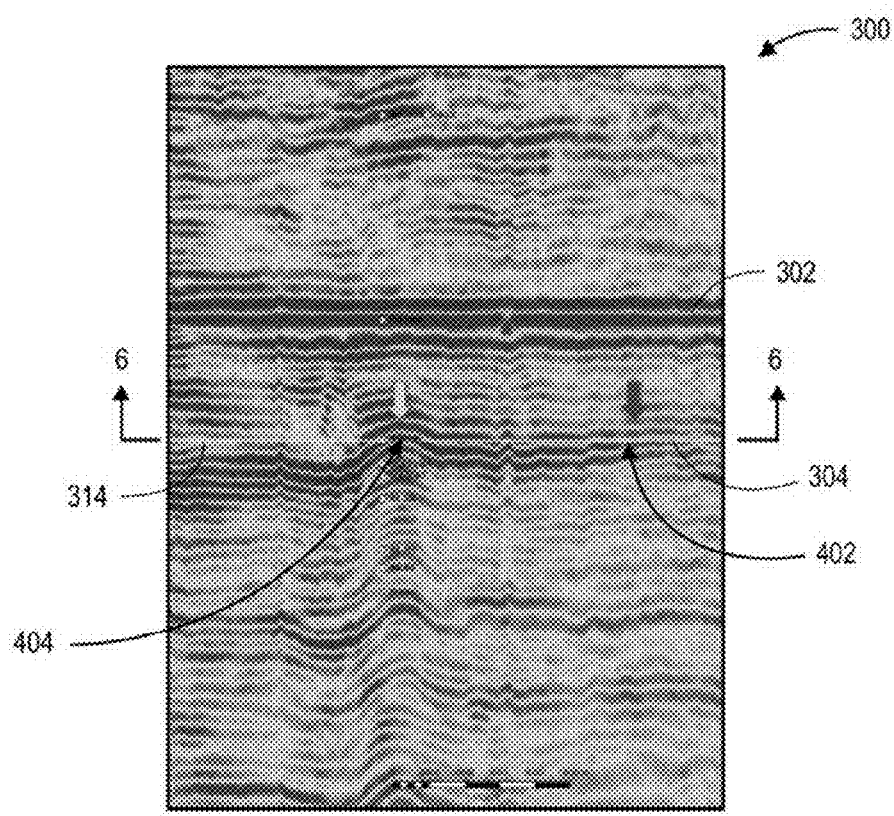
FIG. 4 illustrates the seismic image with a primary signal of an event in the overburden flattened, according to an embodiment.

Referring again to FIG. 2, the method 200 may proceed to determining that flattening the first primary signal 302 causes the second primary signal 304 to be flattened in response thereto, as at 208, for example, using a processor to compare signals and/or stacks. FIG. 4 illustrates an example of the seismic image 300, with the primary signal 302 having been flattened (e.g., as at 206). Comparing the views of the second primary signal 304 in FIGS. 3 and 4, it may be appreciated that flattening of the first primary signal 302 causes flattening of the second primary signal 304, which indicates potential multiples contamination generated by the upper event represented by the first primary signal 302. Line 314 may represent a multiple which occurs and remains in the stack at the flattened parts of the second primary signal 304, as indicated by areas 402 and 404. Thus, as shown, the multiple 314 may intersect the layer of interest, i.e., as represented by the primary signal 304 at the areas 402, 404. Such contamination may indicate locations where multiples interference remains, despite pre-stack or any other existing processing techniques, as applied using the best judgment of one of ordinary skill in the art.

Flattening, however, may give a false positive for multiples contamination when the multiples generator (i.e., at the event represented by the first primary signal 302) and the affected or target layer (i.e., at the event represented by the second primary signal 304) are "seismically conformable." That is, if the event represented by the first primary signal 302 and the event represented by the second primary signal 304 are too close together, i.e., closer together than a representative tuning thickness, the primary signal 304 may appear to be flattened by the flattening of the primary signal 302 due to their proximity relative to the resolution of the seismic image, despite there potentially being no multiples contamination. Accordingly, referring again to FIG. 2, the method 200 may include establishing a representative tuning thickness using any suitable technique, to determine that the first and second events (represented by the first and second primary signals 302, 304, respectively) are not seismically conformable, as at 210, e.g., by ensuring that they are sufficiently separated. In one embodiment, the threshold depth separation for "seismically conformable" may be or be related to the tuning thickness and may be about 50 feet (about 15 meters), 100 feet (about 30 meters), about 200 feet (about 60 meters), about 300 feet (about 90 meters), or any other measurement, depending on the instantaneous change in interval velocity and/or frequency content.

With potential or "expected" contamination areas 402, 404 noted, i.e., where not attenuated by pre-stack attenuation techniques due to close or no moveout difference between the primary signal 304 and the multiple 314, the method 200 may proceed to determining spatially that the multiples generated by the first event interfere with the primary signal 304 for the second event, as at 212. In this context, "spatially" generally refers to a determination employing an areal view of potential contamination, as will be described in greater detail below. To assist in referring to an areal view, for example, determining at 212 may include determining the characteristics of the primary signal 304 when it is contaminated by one of more various types of multiples, which can interfere at the same level.

Figure 5:
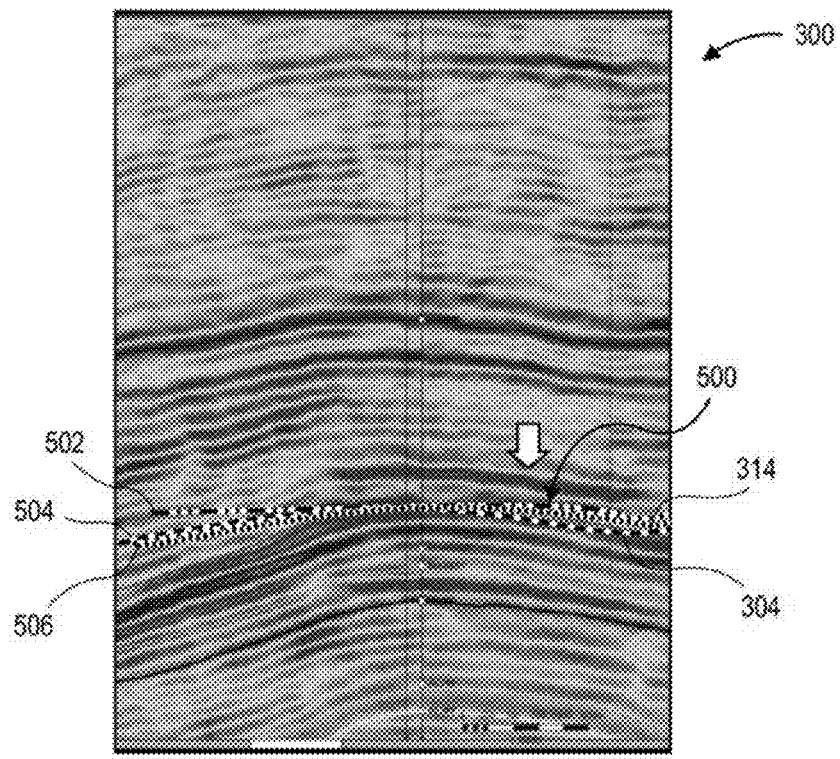
FIG. 5 illustrates an enlarged view of FIG. 3 with additional peg-leg multiples posted on top of a reservoir layer, and showing an area where multiples from the one or more multiples generators in the overburden interfere with a primary signal of a target layer, according to an embodiment.

Accordingly, FIG. 5 illustrates an enlarged view of a portion of FIG. 3, according to an example. As may be appreciated, the primary signal 304 may evidence a discontinuity in the amplitude thereof at the area 402 (also shown in FIG. 4). The area of discontinuity at the area 402 may be caused by one or more multiples generated by events in the overburden. For example, the peg-leg multiple 314, generated by the event represented by the first primary signal 302 may interfere with the second primary signal 304 at the area 402, for example, either dimming or causing an amplitude burst (dimming is shown) in the primary signal 304 at the area 402. Further, one or more other multiples (three shown: 502, 504, 506) generated by one or more other events that are shallower than the event represented by the second primary signal 304, than the event represented by the first primary signal 302, or both, may also potentially be left unattenuated and interfering with the primary signal 304 at the area 402 as well.

The method 200 may include referring to data observed during the flattening and/or by constructing a multiples model, as at 213, e.g., using data collected at a nearest available well, to characterize the effects of contamination. Tables 1-3, below, indicate examples of such data; however, it will be appreciated that all numeric values presented therein are for purposes of illustration and are not to be considered limiting. Moreover, Tables 1-3 illustrate that the nature of contamination and may facilitate modeling to target attenuation techniques. Tables 1-3 further illustrate first pass values relevant to three random interfaces, illustrating the effect of contamination in terms of scaled amplitudes at a target level (e.g., the level represented by primary signal 304) by multiples coming from reflectors in the overburden. Thus, it will be seen that the multiples modeling at 213 may enable an evaluation of the degree of contamination at the identified areas, e.g., using the data as provided in Tables 1-3.

By way of example, Tables 1-3 reference a four layer consideration (events 1-4). However, it will be appreciated that any number of levels may be employed depending on geologic information, number of packages identified, etc. In an embodiment, the event 3 may be the event represented by the first primary signal 302, e.g., in FIG. 3, and the event 4 may be the event represented by the second primary signal 304. Tables 1-3 may show the effects of multiples generated above or below a particular layer and how they affect the primary signal of a lower, layer of interest (e.g., the layer represented by primary signal 304).

In an embodiment, the results of forward modeling, e.g., during package identification at 204, may be employed to identify packages that are likely to generate multiples at a level of interest, as well as the nature and characteristics of the contamination. Table 1 indicates an example of such data, with three events identified as potential multiples generators, on a fourth event (e.g., the event represented by the second primary signal 304), in terms of likelihood of causing multiples to interfere with the primary signal. As indicated, multiples generated by the event 1 may have a medium likelihood of interfering with the primary signal of event 4. Multiples generated by the event 2 may have a high likelihood of interfering with the primary signal of event 4. Finally, event 3 may have a lower, but non-zero, likelihood of generating multiples that interfere with the primary signal of event 4. It will be appreciated that the order of interference could change based on improved understanding from multiple modeling.

TABLE 1

Probability of Multiples Affecting Level 4 Primary Signal

| Primary Signal | Multiples Generator | | | |
| --- | --- | --- | --- | --- |
|  | Event 1 (Sandstone) | Event 2 (Shale) | Event 3 (Salt) | Event 4 (Limestone) |
| Event 1 (Sandstone) | | | | |
| Event 2 (Shale) | | | | |
| Event 3 (Salt) | | | | |
| Event 4 (Limestone) | Medium | High | Low | Not Possible |

Table 2 may provide a baseline to which the recorded signal may be compared. The difference between the expected signal and the recorded signal may be indicative of the effects of unfiltered multiples contamination of the signal.

TABLE 2

Average Reflectivities From Well

| Primary Signal | Upper Layer | | | |
| --- | --- | --- | --- | --- |
|  | Event 1 (Sandstone) | Event 2 (Shale) | Event 3 (Salt) | Event 4 (Limestone) |
| Event 1 (Sandstone) | 0 | 0.05 | −0.6 | −0.5 |
| Event 2 (Shale) | −0.3 | 0 | −1 | −0.08 |
| Event 3 (Salt) | 0.4 | 1 | 0 | 0.1 |
| Event 4 (Limestone) | 0.7 | −0.8 | −0.8 | 0 |

Table 3 illustrates the effect of multiples contamination by comparing the contaminated signals to the expected average. The average reflectivities for each of the events 1-4 with various other types of rock may be known, as shown in Table 2, e.g., from modeling based on well data. Rock types in the various layers may be established from well cuttings from mud logs, well log signatures, and/or the like. With the multiple modeling employed to determine the reflectivities at the boundaries of certain types of layers (Table 2), the interference (i.e., differences in signal reflectivity) may be characterized and calculated in terms of amplitude dimming, amplitude bursts, changes in polarity, etc., as indicated by way of illustrative example in Table 3, e.g., after ruling out the possibility of fluid effects using amplitude variation with offset (AVO) modeling.

TABLE 3

Multiple + Primary Signal

| Primary Signal | Upper Event | | | |
| --- | --- | --- | --- | --- |
|  | Event 1 (Sandstone) | Event 2 (Shale) | Event 3 (Salt) | Event 4 (Limestone) |
| Event 4 Primary + Event 1 Multiples | 0.7 | −0.75 | −1.4 | −0.5 |
| Event 4 Primary + Event 2 Multiples | 0.4 | −0.8 | −1.8 | −0.08 |
| Event 4 Primary + Event 3 Multiples | 1.1 | 0.2 | −0.8 | 0.1 |

The middle row of Table 3 may be indicative of the interference from the high likelihood event 2 on the primary signal for the event 4, i.e., the event or layer of interest. As shown, the difference between the reflectivities for the signal at event 4 and the expected average reflectivities for the primary signal, as shown in Table 3, for the same layer, may indicate the nature of the interference. For example, the multiple from event 2 may interfere with the primary signal for event 4 to result in amplitude dimming for sandstone, unchanged for shale, high dimming or salt, and dimming for limestone. Such observations may become concrete after multiple modeling, e.g., during 204, as contributing factors to the nature and/or degree of contamination generated by single or multiple layers from the overburden.

Figure 6:
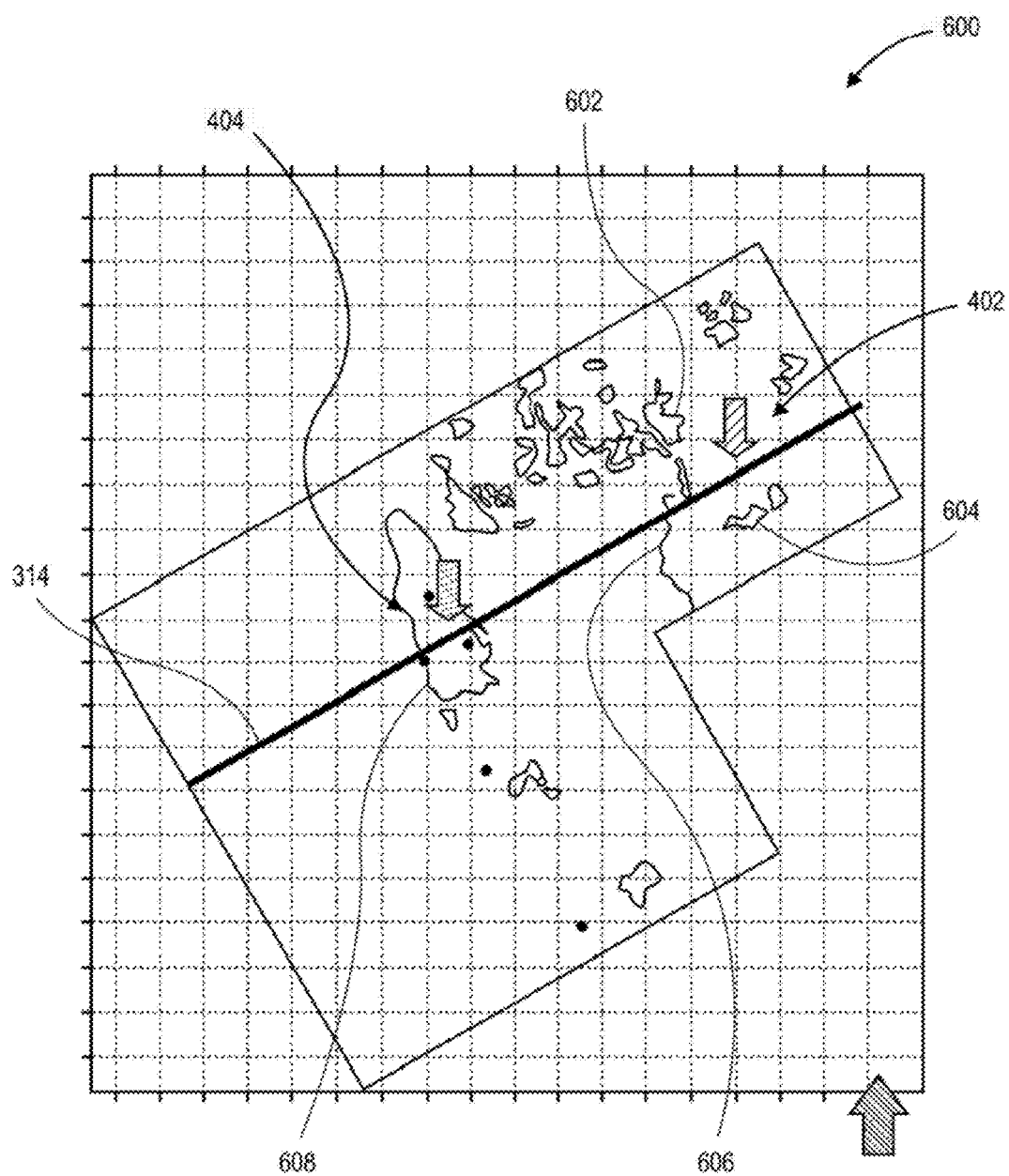
FIG. 6 illustrates an areal map view of a layer of the seismic image, indicating the potential multiples contamination for a given reservoir level, according to an embodiment.

Referring again to determining spatially at 212, with the characteristics of the contaminated signals calculated, determining at 212 (FIG. 2) may then proceed to marking where the multiples contamination areas 402, 404 (FIGS. 4 and 5) identified in the sectional views of the seismic image 300 exists in the areal view of the second primary signal 304, as shown in FIG. 6. Such marking may proceed by extrapolating the identified multiples contamination areas 402, 404 to a larger area, without necessarily having to repeat the flattening and/or other analysis for each section. Further, affected areas may be identified after evaluating for the whole area. For example, random checks may be performed to determine whether the area identified is accurate, as this area may be the focus when validating the multiple attenuation technique, according to an embodiment of the method 200.

FIG. 6 depicts such an areal image 600, taken along the flattened multiple 314 (i.e., line 6-6) shown in FIG. 4. FIG. 6 further illustrates the two contamination areas 402, 404 determined by the flattening and modeling, according to an embodiment. Imprint lines 602-608 demark examples of areas where the flattened multiple 314 interferes with, e.g., intersects, the second primary signal 304. The imprint line 608 may be located proximal to the identified contamination area 402, imprint lines 604-608 are located proximal to the point of contamination 404. Each line 602-608 may indicate an area where the signal attributes (e.g., amplitude) match those determined above to be indicative of multiples contamination.

As can be appreciated, there may generally be no lines present left of the area 402, and, for example between areas 402 and 404. This may indicate that the multiples 314 in these general locations had a different moveout than the primary signal 304, and therefore were identified and attenuated pre-stack or by other processing techniques. Moreover, the contamination is less between line 606 and area 402 than proximal to the area 404, which conforms with the expected results of the pre-stack processing as more effectively removing the multiples contamination outside the crestal area, which may not conform as well to the primary signal 304.

The areas, e.g., east of or right of, as shown, lines 606-608 may be identified, e.g., visually, and isolated as areas with possible contamination, e.g., where the seismic image may be unreliable. Seismic-derived attributes may be used with caution. The contamination may influence the amplitudes but may or may not alter the overall inferences, depending, for example, on the nature/degree of the multiple interferences. Pilot studies may then be conducted in areas with high levels of contamination, such as proximal to the area 402, using the attenuation techniques of one or more embodiments of the method 200 and data from nearby (e.g., nearest) wells, to correct the seismic image using techniques less or not susceptible to multiples contamination. Further, the method 200 may be repeated, for example, for the near, mid, and far stacks separately, e.g., by flattening progressively shallower layers and gauging the flattening effect on the primary signal 304, and then viewing the areal map to determine the location of the identified multiples contamination. Such repetition of the analysis for each of the partial or angle (near, mid, far) stacks may further validate the results of the identification technique.

The method 200 may then proceed to attenuating the multiples as at 214 and verifying the results, as at 216. A variety of factors may be employed to verify the results, for example, comparing a stack generated with the multiples attenuated at 214, with known data. Data collected at a nearest well (or any other wellbore) may be employed in a pilot study to directly identify structures, such as faults, which may also be used as a calibration point for structure imprints captures by various relevant data. If the stack generated with the multiples attenuated retains these faults, it may indicate that the results are accurate. Similarly, other structural and/or geological consistencies may be determined, such as reservoir discontinuities remaining apparent, cross-cutting reservoir events being avoided, and a general preservation of primary events.

The attenuated, validated stack may then be compared to stacks processed using no and/or other multiples identification/attenuation techniques, as at 218. If, for example, the differences between the stack generated by the other techniques and the stack generated using the method 200 show changes where expected multiples contamination occurs, e.g., due to the geological characteristics of the region, as described above, the results of the method 200 may be further confirmed. If the method 200 produces acceptable results, the stack created with the attenuated multiples may be employed to provide greater accuracy to the seismic imaging. If the results are determined to be unacceptable, then modeling, flattening, or other parameters may be reassessed and altered, and the method 200 repeated until acceptable results are found, e.g., using the evaluation indicated in Tables 1-3, above, in conjunction therewith to determine a nature and degree of attenuation in each of the angle (near, mid, far) stacks.

Figure 7:
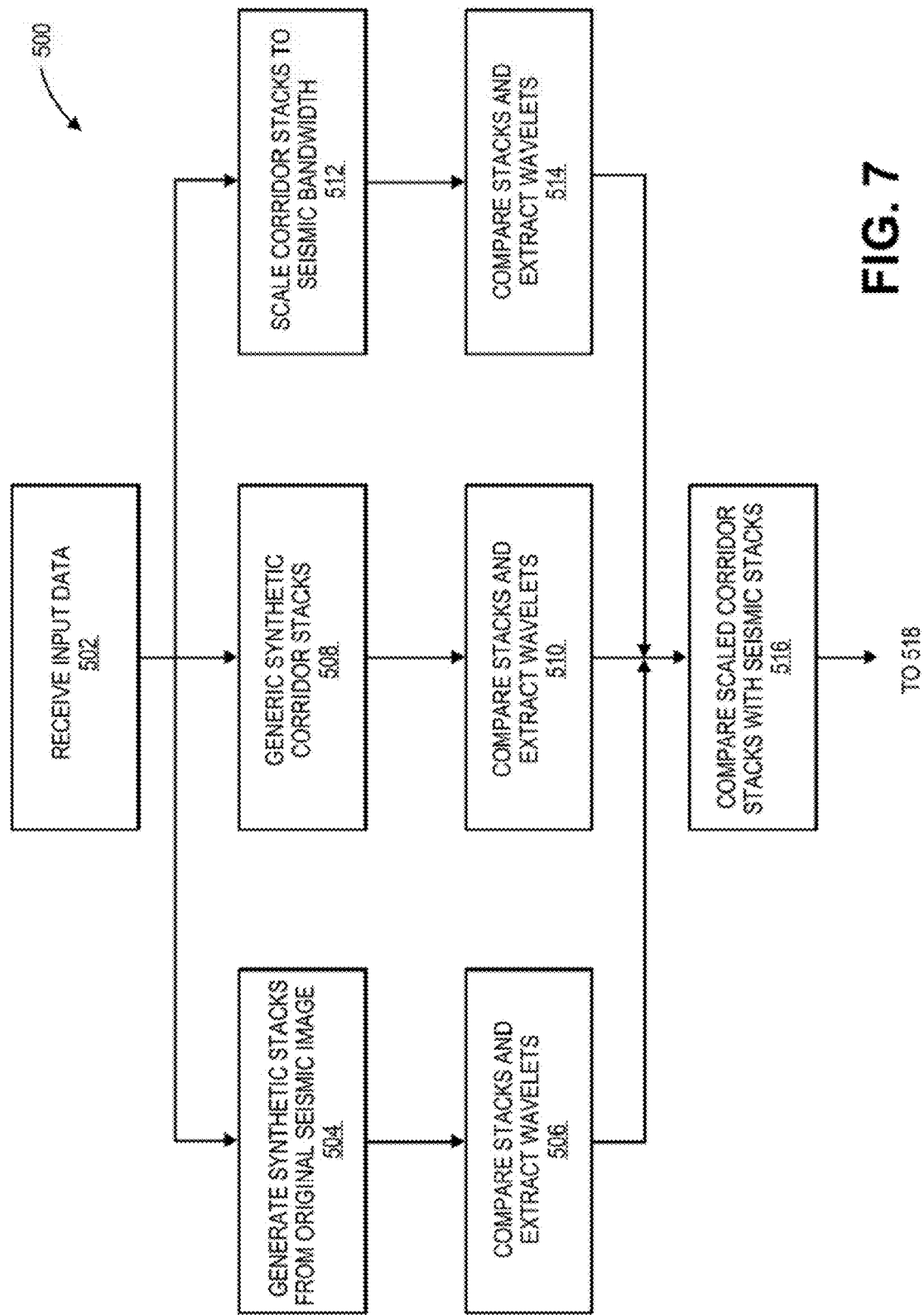
FIGS. 7 and 8 illustrate flowcharts of a method for isolating multiples in a seismic image, according to an embodiment.

FIG. 7 illustrates another method 500 for isolating multiples contamination, according to an embodiment. The method 500 may begin, for example, by receiving inputs data, as at 502, for example, seismic data and/or data based on seismic data. Such data may include cross-well seismic images, time domain reflectivity, markers, litho-columns, reflectivity at certain levels, etc. The input data may also include a corridor profile. As discussed above, a corridor profile may be, for example, a vertical seismic profile of the area immediately proximal to a well. Such stacks may be reasonably expected to be free from multiples contamination along a certain interval, for example, for about three quarters of the profile. The method 500 may then proceed to making near, mid, far, and/or full stacks, using synthetic seismology modeling based on the seismic image at 504 and based on the corridor profile, as at 508. Further, the method 500 may include scaling the corridor stacks to a seismic bandwidth, as at 512 including, for example, generating the synthetic stacks by extracting wavelet from scaled corridor data. In each case, the stacks generated may be compared to one another, and wavelets may be extracted therefrom, as at 506, 510, and 514.

The method 500 may then proceed to comparing to the stacks generated from the original seismic data at 504 with those generated from the scaled corridor profile at 512. Since the corridor stacks are expected to be free from multiples (e.g., for a majority of the column), the difference between the synthetics generated from scaled corridor stacks and the stacks based on the seismic images may indicate possible intervals where multiples contamination is present. Accordingly, using one or more embodiments of the method 200, described above, the synthetic stacks based on the seismic data can be spatially analyzed, and portions of horizons where multiples are apparent may be identified and/or extracted.

Figure 8:
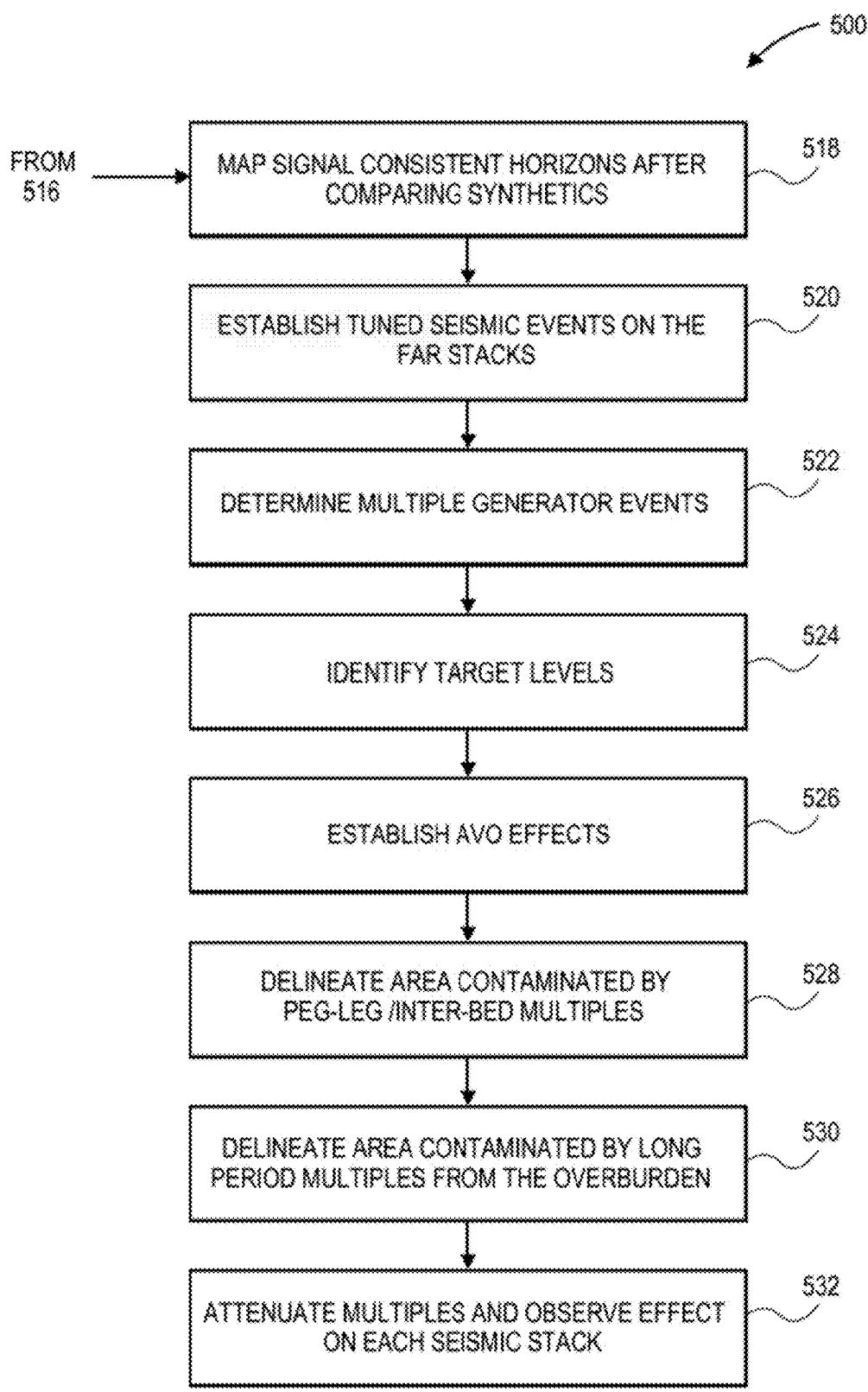

Referring now to FIG. 8, in the method 500, once the synthetics are compared at 516, for example, the method 500 may proceed to mapping signal consistent horizons, as at 518. The method 500 may also include establishing tuned seismic events on far stacks, as at 520. For example, the tuning of the stacks may result in two horizons becoming one in the far stack; accordingly, this potential is checked at 520.

The method 500 may then proceed to determining multiples generator events, as at 522, and target levels (e.g., levels of interest such as reservoirs and areas around reservoirs), as at 524. The method 500 may also include establishing amplitude variation with offset (AVO), which may be due to the presence of hydrocarbons, as at 526. The AVO may be determined, for example, by comparing the partial stacks, and may thus be separated from consideration of multiples contamination. As explained above, the method 500 may then proceed to spatially determining an area contaminated by peg-leg or inter-bed multiples, as at 528, and delineating the area contaminated by long period multiples from overburden, as at 530. Thereafter, the multiples may be attenuated at 532 and the effect observed on each of the stacks.

Figure 9:
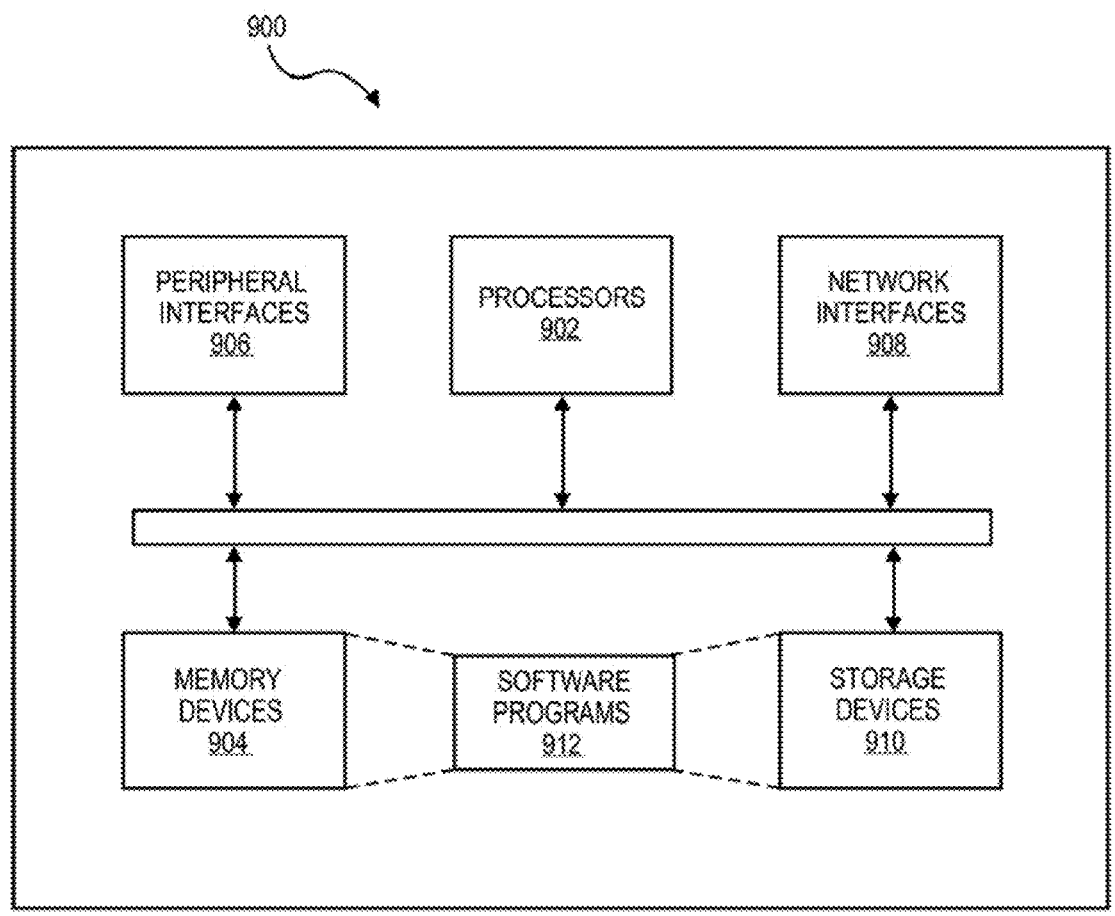
FIG. 9 illustrates a processor system, according to an embodiment.

Embodiments of the disclosure may also include one or more systems for implementing one or more embodiments of the method 200 and/or 500. FIG. 9 illustrates a schematic view of such a computing or processor system 900, according to an embodiment. The processor system 900 may include one or more processors 902 of varying core (including multiple cores) configurations and clock frequencies. The one or more processors 902 may be operable to execute instructions, apply logic, etc., for example, to flatten the seismic image 300, identify packages, determine spatially any areas of contamination, compare results, verify results, etc., according to one or more of the embodiments of the method 200 described above. It will be appreciated that these functions may be provided by multiple processors or multiple cores on a single chip operating in parallel and/or communicably linked together.

The processor system 900 may also include a memory system, which may be or include one or more memory devices and/or computer-readable media 904 of varying physical dimensions, accessibility, storage capacities, etc. such as flash drives, hard drives, disks, random access memory, etc., for storing data, such as images, files, and program instructions for execution by the processor 902. In an embodiment, the computer-readable media 904 may store instructions that, when executed by the processor 902, are configured to cause the processor system 900 to perform operations. For example, execution of such instructions may cause the processor system 900 to implement one or more portions and/or embodiments of the method(s) described above.

The processor system 900 may also include one or more network interfaces 906. The network interfaces 906 may include any hardware, applications, and/or other software. Accordingly, the network interfaces 106 may include Ethernet adapters, wireless transceivers, PCI interfaces, and/or serial network components, for communicating over wired or wireless media using protocols, such as Ethernet, wireless Ethernet, etc.

The processor system 900 may further include one or more peripheral interfaces 108, for communication with a display screen, projector, keyboards, mice, touchpads, sensors, other types of input and/or output peripherals, and/or the like. In some implementations, the components of processor system 900 may not be enclosed within a single enclosure or even located in close proximity to one another, but in other implementations, the components and/or others may be provided in a single enclosure.

The memory device 904 may be physically or logically arranged or configured to store data on one or more storage devices 910. The storage device 910 may include one or more file systems or databases in any suitable format. The storage device 910 may also include one or more software programs 912, which may contain interpretable or executable instructions for performing one or more of the disclosed processes. When requested by the processor 902, one or more of the software programs 912, or a portion thereof, may be loaded from the storage devices 910 to the memory devices 904 for execution by the processor 902.

Those skilled in the art will appreciate that the above-described componentry is merely one example of a hardware configuration, as the processor system 900 may include any type of hardware components, including any necessary accompanying firmware or software, for performing the disclosed implementations. The processor system 900 may also be implemented in part or in whole by electronic circuit components or processors, such as application-specific integrated circuits (ASICs) or field-programmable gate arrays (FPGAs).

It will be appreciated, then, that embodiments of the present disclosure provide a method for identifying multiples contamination in a seismic image, particularly in a layer-cake geology. More particularly, the method may integrate an understanding of the layer-cake geology into identifying spatial areas of potential multiples contamination. The method may also include evaluating a degree of contamination at the identified areas, for each given level, as established by multiples modeling from data collected at the nearest available well. Further, the method may include validating the areas of contamination identified, and/or attenuated, by comparing the results to those expected from modeling.

Such validations may include validating the results using each partial stack and ruling out the possibility of fluid effects using AVO modeling. Further, the validating may include evaluating the results using application of techniques in affected areas versus unaffected areas, e.g., as identified using the knowledge of the geology and/or through modeling. The validation may also include evaluating the interference of multiples at a reservoir level, with the multiples being potentially generated and multiple levels in the overburden. The validation may also include determining if the multiples constructively or destructively interfere with the primaries, and, similarly, whether a plurality of multiples constructively or destructively interferes with the primaries.

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 900 may be used to execute programs according to instructions received from another program or from another processor system altogether. Similarly, commands may be received, executed, and their output returned entirely within the processing and/or memory of the processor system 900. Accordingly, in some cases, a visual interface command terminal and/or any terminal may be omitted.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and may include methods within program code, whether static or dynamic, and whether they return a value or not. The term "function" has been used in the claims solely to avoid ambiguity or conflict with the term "method," the latter of which may be used to indicate the subject matter class of particular claims.

What is claimed is:

1. A method for identifying multiples contamination in a stack, comprising:

determining, based on a sectional representation of a seismic image including a first layer and a second layer that are located at different depths from one another, that a signal representing reflection at the first layer potentially generates a multiples contamination in a contaminated portion of a signal representing reflection at the second layer;

matching an area of potential multiples contamination in an areal representation of the second layer with the contaminated portion of the signal representing reflection at the second layer in the sectional representation, wherein matching the area in the areal representation comprises:

determining a characteristic of the contaminated portion of the signal representing reflection in the second layer; and determining the area as being where a plurality of signals representing reflection in the second layer exhibit the characteristic;

constructing, using a processor, a model of multiples contamination using well data;

evaluating a degree of contamination in the area of potential multiples contamination based on the model of multiples contamination;

attenuating multiples contamination in the area of potential multiples contamination; and validating the stack after attenuating.

2. The method of claim 1, wherein validating the stack comprises comparing two or more partial stacks with multiples contamination attenuated.

3. The method of claim 1, further comprising ruling out fluid effects using amplitude variation with offset (AVO) modeling.

4. The method of claim 1, wherein validating the stack comprises comparing the area of potential multiples contamination with one or more areas expected to include multiples contamination.

5. The method of claim 1, wherein constructing the model of multiples contamination further comprises determining whether one or more multiples interfere constructively or destructively with the signal representing the second layer.

6. The method of claim 1, wherein constructing the model of multiples contamination further comprises modeling multiples generated in an overburden to determine expected characteristics of the signal representing the second layer.

7. The method of claim 1, wherein matching the area of potential multiples contamination comprises:

flattening the first layer;

determining that flattening the first layer causes the contaminated portion of the signal representing the second layer to be flattened; and marking areas spatially proximal to the portions of the signal representing the second layer that are flattened, in the areal view of the second layer.

8. The method of claim 7, further comprising determining that the first and second layers are not seismically conformable.

9. The method of claim 8, wherein determining that the first and second layers are not seismically conformable comprises establishing a tuning thickness, wherein determining that a depth difference between two layers that is less than the tuning thickness is indicative of the two layers being seismically conformable.

10. The method of claim 1, wherein the characteristic is selected from the group consisting of: amplitude dimming, amplitude burst, and a change in polarity.

11. The method of claim 1, further comprising extrapolating the area to a larger area, based at least partially on the characteristic.

12. The method of claim 11, wherein the extrapolating is performed without repeating determining that the signal representing reflection in the first layer potentially generates the multiples contamination in the contaminated portion of the signal representing reflection at the second layer.

13. A computing system, comprising:

a processor; and a memory system including one or more computer readable media storing instructions that, when executed by the processor, are configured to cause the computing system to perform operations, the operations comprising:

determining, based on a sectional representation of a seismic image including a first layer and a second layer that are located at different depths from one another, that a signal representing reflection at the first layer potentially generates a multiples contamination in a contaminated portion of a signal representing reflection at the second layer;

identifying an area of potential multiples contamination in an areal representation of the second layer based on the determination of the contaminated portion of the signal representing reflection at the second layer in the sectional representation, wherein identifying the area in the areal representation comprises:

determining a characteristic of the contaminated portion of the signal representing reflection in the second layer;

determining the area as being where a plurality of signals representing reflection in the second layer exhibit the characteristic; and extrapolating the identified area to a larger area, based at least partially on the characteristic;

constructing a model of multiples contamination using well data;

evaluating a degree of contamination in the area of potential multiples contamination based on the model of multiples contamination;

attenuating multiples contamination in the area of potential multiples contamination; and validating the stack after attenuating.

14. The system of claim 13, wherein validating the stack comprises comparing results for two or more partial stacks.

15. The system of claim 13, further comprising ruling out fluid effects using amplitude variation with offset (AVO) modeling.

16. The system of claim 13, wherein validating the stack comprises comparing the area of potential multiples contamination with one or more areas expected to include multiples contamination.

17. The system of claim 13, wherein constructing the model of multiples contamination further comprises determining whether one or more multiples interfere constructively or destructively with the signal representing the second layer.

18. The system of claim 13, wherein constructing the model of multiples contamination further comprises modeling multiples generated in an overburden to determine expected characteristics of the signal representing the second layer.

19. The system of claim 13, wherein identifying the area of potential multiples contamination comprises:

flattening the first layer;

determining that flattening the first layer causes the contaminated portion of the signal representing the second layer to be flattened; and marking areas spatially proximal to the portions of the signal representing the second layer that are flattened, in the areal view of the second layer.

20. The system of claim 19, further comprising determining that the first and second layers are not seismically conformable, wherein determining that the first and second layers are not seismically conformable comprises establishing a tuning thickness, wherein determining that a depth difference between two layers that is less than the tuning thickness is indicative of the two layers being seismically conformable.

21. A non-transitory computer-readable medium storing instructions that, when executed by a processor of a computing system, are configured to cause the computing system to perform operations, the operations comprising:

determining, based on a sectional representation of a seismic image including a first layer and a second layer that are located at different depths from one another, that a signal representing reflection at the first layer potentially generates a multiples contamination in a contaminated portion of the signal representing reflection at the second layer;

matching an area of potential multiples contamination in an areal representation of the second layer with the contaminated portion of the signal representing reflection at the second layer in the sectional representation, wherein matching the area in the areal representation comprises:

determining a characteristic of the contaminated portion of the signal representing reflection in the second layer; and determining the area as being where a plurality of signals representing reflection in the second layer exhibit the characteristic;

constructing a model of multiples contamination using well data, wherein constructing the model of multiples contamination comprises modeling multiples generated by the first layer to determine expected characteristics of the signal representing the second layer;

evaluating a degree of contamination in the area of potential multiples contamination using the model of multiples contamination;

attenuating multiples contamination in the area of potential multiples contamination; and validating the stack after attenuating, wherein validating the stack comprises:

comparing two or more partial stacks with multiples attenuated;

ruling out fluid effects using amplitude variation with offset (AVO) modeling; and comparing the area identified in the areal representation with one or more areas expected to include multiples contamination from the model of multiples contamination.

* * * * *